United States Patent [19]
Ishida et al.

[11] Patent Number: 5,089,999
[45] Date of Patent: Feb. 18, 1992

[54] DISC CONTROL APPARATUS

[75] Inventors: Ryuji Ishida; Toyoo Kiuchi, both of Tokyo, Japan

[73] Assignee: NEC Corporation, Tokyo, Japan

[21] Appl. No.: 371,931

[22] Filed: Jun. 27, 1989

[30] Foreign Application Priority Data

Jun. 28, 1988 [JP] Japan .................. 63-161466

[51] Int. Cl.$^5$ .............................................. G11B 7/00
[52] U.S. Cl. ................................ 369/32; 369/44.28; 369/44.41; 360/77.06
[58] Field of Search ................ 360/78.04, 77.06; 369/32, 44.28, 44.29, 59, 44.41

[56] References Cited

U.S. PATENT DOCUMENTS

| | | | |
|---|---|---|---|
| 4,839,877 | 6/1989 | Kulakowski et al. | 369/48 |
| 4,860,272 | 8/1989 | Nishikawa et al. | 360/78.04 |
| 4,907,109 | 3/1990 | Senio | 360/78.04 |

Primary Examiner—Roy N. Envall, Jr.
Assistant Examiner—Nabil Hindi
Attorney, Agent, or Firm—Helfgott & Karas

[57] ABSTRACT

A disc control apparatus comprises a first register for storing a first track position which is presently traced, a second register for storing a second track position which is next to be traced, a first memory for storing a first rotating number of a disc under a seek operation, and a second memory for storing a second rotating number of the disc at a settling time. The first track position is an upper address signal for the first memory, and a lower address signal for the first memory is produced in accordance with a subtraction between the first and second track positions, so that the first memory is accessed at an address composed of the upper and lower addresses to produce the first rotating number signal. The second memory is accessed at an address determined solely by the first track position to produce the second rotating number signal. A signal obtained from the aforementioned subtraction, and the first and second rotating number signals are added to produce a head moving signal which indicates a head moving direction and a jumping track number. As a result, the head is controlled to move from the first track position to the second track position by a single seek operation.

3 Claims, 3 Drawing Sheets

DISC CONTROL APPARATUS

FIELD OF THE INVENTION

The invention relates to a disc control apparatus, and more particularly to a disc control apparatus for controlling a reading and/or recording head to access to a disc having a spiral track.

BACKGROUND OF THE INVENTION

In a conventional disc control apparatus for controlling a reading and/or recording head (simply called "head" hereinafter) to access to a disc having a spiral track, the head is controlled to move from a first track (physical) position presently traced on the spiral track to a second track(physical) position to be next traced on the spiral track. In the control of moving the head on the disc having the spiral track, the number of tracks is calculated between the first track position and the second track position, so that the head is moved in an inner or outer radial direction on the disc by a distance determined based on the calculated track number. Operation of moving the head on the disc from the first track position to the second track position at a predetermined high speed is defined as "seek", and a time period which it takes the head to begin reading information stored in the second track position of the disc stably after the head arrives on the second track position is defined as "settling time".

Here, it is assumed that a rotating number of a disc having a spiral track used as, for instance, a CD-ROM is 360 rpm, and a moving speed of a head is 3 msec/one track, and further assumed that information is read from the center portion of the disc to the peripheral portion thereof under a state that the disc is rotated such that a track speed is linearly maintained constant relative to the head. Where the head is controlled to move from a first track position A of a spiral track to a second track position B of the spiral track which is on the outside relative to the first track position A by the track number of 5, the head is started to move in a direction from the first track position A to the outer peripheral portion of the disc, and is stopped to move when the number of tracks is counted by "5", so that the head is assumed to arrive on the second track position B. Accordingly, information is read from the first track position A of the disc and then the second track position B of the disc successively.

According to the conventional disc control apparatus, however, there is a disadvantage that an access time becomes long for the following reason. That is, the disc is kept rotating during the moving of the head in the radial direction on the disc, thereby resulting that the head is positioned to be deviated from the second track position B which is a destination of the head by a distance determined based on a product of a moving time of the head and a rotating speed of the disc. As a result, operation of correcting the deviated position error in which the head is corrected to move from the deviated position to the destination (the second track position B) is necessary to be carried out.

In accordance with the aforementioned assumption, the rotating number $N_{R1}$ of the disc is calculated during a time period of moving the head from the first track position A to second track position B in the equation (1).

$$N_{R1} = 360 \text{ rpm} \times 3 \text{ msec/one track} \times 5 \text{ tracks} = 0.9 \tag{1}$$

The rotating number $N_{R2}$ of the disc is calculated during a settling time in the equation (2), where the settling time is 1.5 msec.

$$N_{R2} = 360 \text{ rpm} \times 1.5 \text{ msec} = 0.09 \tag{2}$$

Consequently, the total rotating number $N_R$ of the disc is calculated in the equation (3).

$$N_R = N_{R1} + N_{R2} = 0.9 + 0.09 = 0.99 \approx 1 \tag{3}$$

That is, the disc is rotated by approximately one before the head is stopped to read information from the disc.

As a result, the head is inevitably moved to a third position C approximately corresponding to a track which is on the outside of the second track position B by one track number, unless the operation of correcting the deviated position error is carried out.

SUMMARY OF THE INVENTION

Accordingly, it is an object of the invention to provide a disc control apparatus in which a head can be moved to a destination track position in one seek operation, thereby avoiding the necessity of a position error correcting operation.

It is a further object of the invention to provide a disc control apparatus in which an access time becomes short.

According to the invention, a disc control apparatus comprises, a head for reading information from a disc having a spiral track, a first means for storing first data indicating a first track position on the spiral track of the disc which is presently traced by the head, a second means for storing second data indicating a second track position on the spiral track of the disc which is next to be traced by the head, a first memory for storing a first rotating number of the disc at a time period during which the head is moved under a seek operation, a second memory for storing a second rotating number of the disc at a settling time period, and an address means for producing address signals in accordance with the first and second data to access the first and second memories, a calculating means for producing a head moving signal in accordance with the first and second data, and the first and second rotating numbers, and a control circuit for controlling the head to move from the first track position to the second track position in accordance with the head moving signal.

BRIEF DESCRIPTION OF DRAWINGS

The invention will be explained in more detail in conjunction with appended drawings wherein.

DESCRIPTION OF PREFERRED EMBODIMENTS

Figure 1:
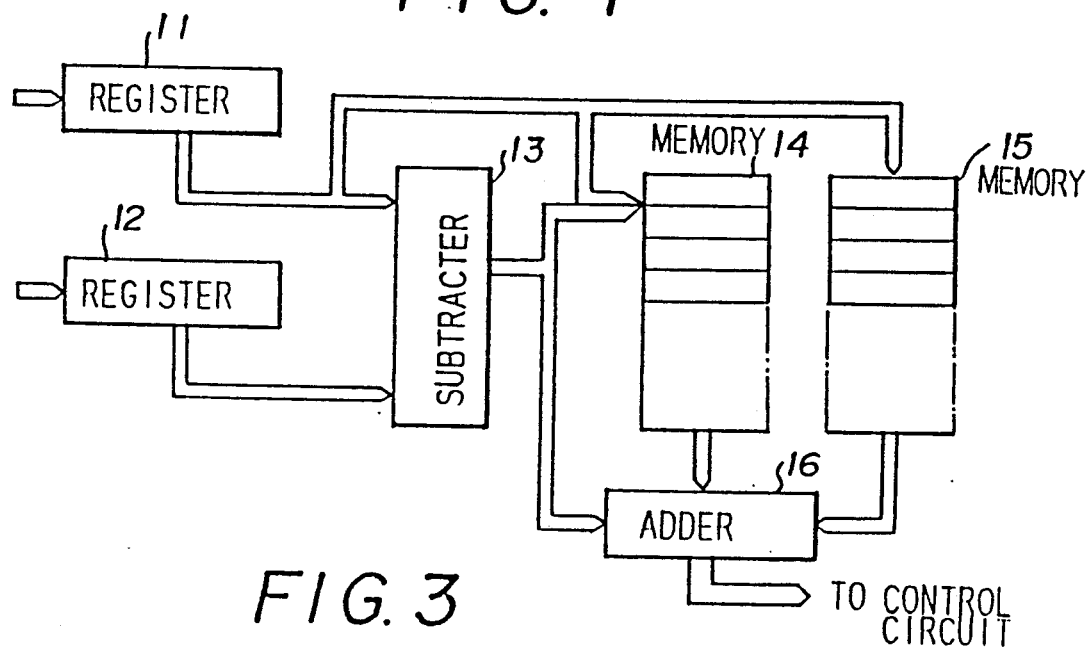
FIG. 1 is a block diagram showing a disc control apparatus in a first embodiment according to the invention.

In FIG. 1, there is shown a disc control apparatus in a first embodiment according to the invention. The disc control apparatus comprises registers 11 and 12, a subtracter 13, memories 14 and 15, and an adder 16, wherein an output of the register 11 is connected to a first input of the subtracter 13 and address inputs of the memories 14 and 15, an output of the register 12 is connected to a second input of the subtracter 13, an output of the subtracter 13 is connected to the address input of the memory 14 and a first input of the adder 16, an output of the memory 14 is connected to a second input of the adder 16, and an output of the memory 15 is connected to a third input of the adder 16. An output of the adder 16 is connected to a control circuit (not shown).

Figure 2:
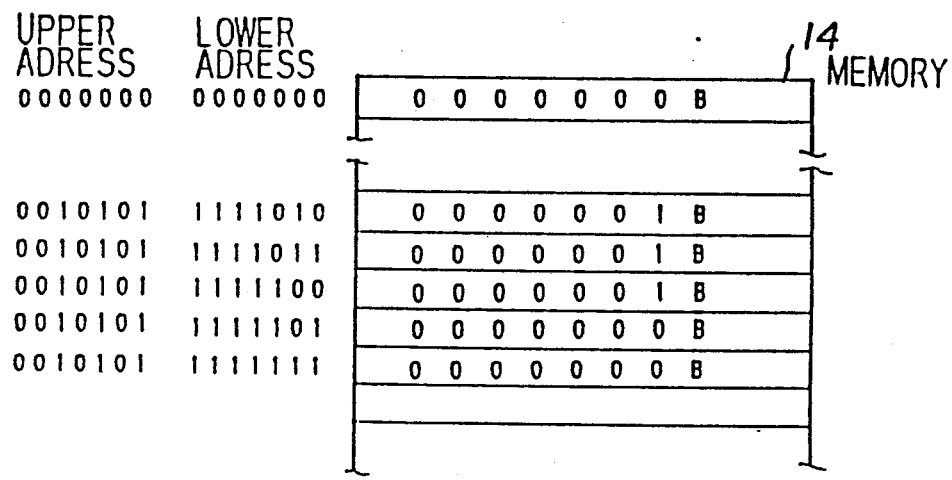
FIG. 2 is a explanatory diagram showing a table of a memory included in the disc control apparatus in FIG. 1.

In the disc control apparatus, the register 11 holds data of a first track position on a disc which is presently traced by a head, and the register 12 holds data of a second track position on the disc which is to be next sought by the head. The memory 14 is a read only memory (ROM) for storing a rotating number of the disc during a time period of a seek operation, wherein an address is determined by a combination of data (upper address) stored in the register 11 and those (lower address) of the subtracter 13 as shown in FIG. 2, and the memory 15 is a ROM for storing a rotating number of the disc during a settling time which is calculated beforehand.

Figure 3:
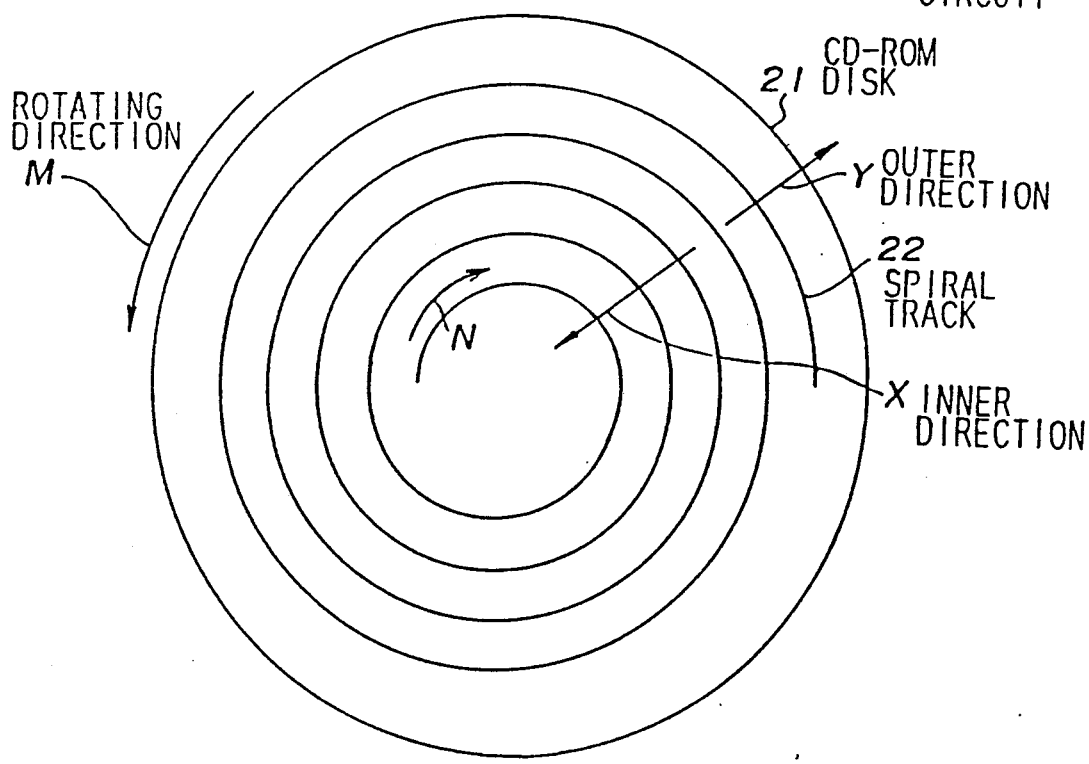
FIG. 3 is an explanatory diagram showing a CD-ROM disc used in the disc control apparatus in FIG. 1.

FIG. 3 shows the disc 21 which is used for a CD-ROM having a spiral track 22, wherein the disc 21 is rotated in an anti-clockwise direction M, and the spiral track 22 is provided with address numbers increasing in a direction indicated by an arrow N.

Figure 4:
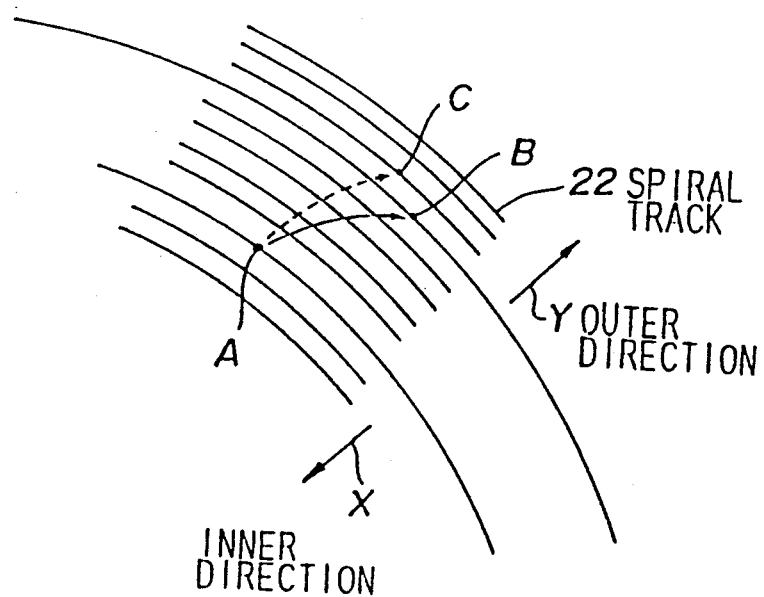
FIG. 4 is an explanatory diagram showing the moving of a head, on the CD-ROM disc in FIG. 3.

FIG. 4 shows an enlarged portion of the disc 21 on which track positions A, B and C are indicated.

In operation, it is assumed that the first track position A is "$0010101_B$", and the second track position B is "$0011010_B$", where the suffix "B" indicates that the codes are binary data, and a value of the data is plus (positive) when the most significant bit is "0", and minus (negative) when the most significant bit is "1". These data are held in the registers 11 and 12, respectively, so that the subtraction "$0010101_B - 0011010_B$" is carried out in the subtracter 13 to supply an output signal "$1111011_B$". As a result, the memory 14 is accessed at an address including "$0010101_B$" (upper address) and "$1111011_B$" (lower address) to provide information of a disc rotation number under a seek operation. In accordance with the address designation, a content "$0000001_B$" of the memory 14 is supplied to the second input of the adder 16. At the same time, the memory 15 is accessed at an address determined by the data of the register 11, so that a rotating number of the disc during a settling time is supplied from the memory 15 to the third input of the adder 16. Here, it is assumed that the output data of the memory 15 is "$0000000_B$". Therefore, the respective three output data "$1111011_B$", "$0000001_B$" and "$0000000_B$" of the subtracter 13, and the memories 14 and 15 are added in the adder 16 to provide an added value "$1111100_B$" which is supplied to the control circuit. The control circuit controls the head to seek in an inner radial direction of the disc 21, as shown in FIG. 3 and 4 by an arrow X, when the most significant bit of the added value is "0", and in an outer radial direction of the disc 21, as shown therein by an arrow Y, when the most significant bit is "1". In this case, the added value is "$1111100_B$", so that the head is controlled to traverse (jump over) four tracks by seeking in the outer radial direction Y on the disc 21, and thus, the head is moved to the second track position B in a single seek operation.

According to the conventional disc control apparatus, however, the head is moved to the third track position C as explained before in conjunction with the equations (1) to (3), despite that the head is controlled to move from the first track position A to the second track position B. Therefore, the head must be corrected to move from the third track position C to the second track position B. This is the aforementioned disadvantage of the conventional disc control apparatus.

Figure 5:
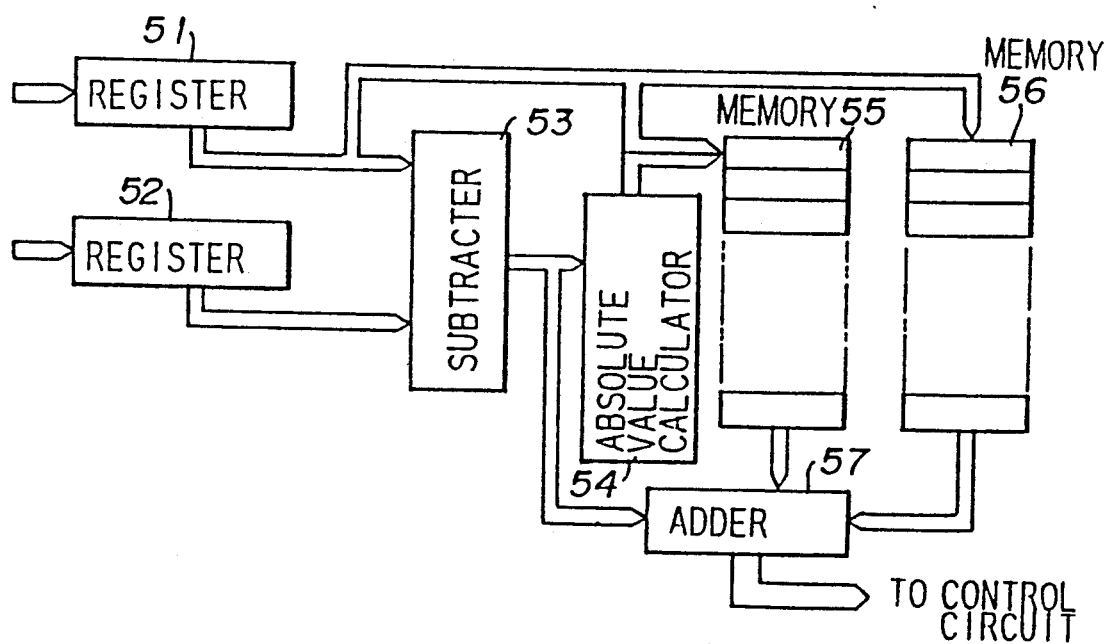
FIG. 5 is a block diagram showing a disc control apparatus in a second embodiment according to the invention.

FIG. 5 shows a disc control apparatus in a second embodiment according to the invention. The disc control apparatus comprises registers 51 and 52, a subtracter 53, an absolute value calculator 54, memories 55 and 56, and an adder 57, wherein an output of the register 51 is connected to a first input of the subtracter 53 and address inputs of the memories 55 and 56, an output of the register 52 is connected to a second input of the subtracter 53, an output of the subtracter 53 is connected to an input of the absolute value calculator 54 and a first input of the adder 57, and output of the absolute value calculator 54 is connected to the address input of the memory 55, outputs of the memories 55 and 56 are connected to second and third inputs of the adder 57, and an output of the adder 57 is connected to a control circuit (not shown).

In the disc control apparatus, the register 51 holds data for indicating a first track position presently traced, and the register 52 holds data for indicating a second track position to be next traced, so that the subtracter 53 provides data for indicating a distance across which a head moves on a disc. The memory 55 is a ROM for storing a calculated rotating number of the disc at the time of a seek operation, and a memory 56 is a ROM for storing a calculated rotating number of the disc at a settling time.

In operation, the data of the registers 51 and 52 are supplied to the subtracter 53, from which a subtraction value corresponding to a moving distance of the head is supplied to the absolute value calculator 54. Thus, an absolute value of the subtraction value is produced in the absolute value calculator 54, so that the memory 55 is accessed at an address determined by the data of the register 51 and the absolute value to provide the rotating number of the disc at the time of a seek operation. At the same time, the memory 56 is accessed at an address determined solely by the data of the register 51 to provide the rotating number of the disc at the settling time. Then, output data of the subtracter 53, and the memories 55 and 56 are added in the adder 57 to provide an added signal which is supplied to the control circuit. Consequently, the head is controlled to move in an inner or outer direction of the disc dependent on a content of the most significant bit of the added signal by jumping across a predetermined number of tracks determined by a content of the added signal excluding the most significant bit.

In the second embodiment, the absolute value calculator is further provided as compared to the first embodiment. Therefore, the number of addresses is decreased in a memory for storing a rotating number of a disc to reduce a capacity thereof by a half, because the rotating numbers are equal in both inner and outer moving directions of a head.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. A disc control apparatus, comprising:
   a head for reading information from a disc having a spiral track;
   a first means for storing first data indicating a first track position on said spiral track of said disc which is presently traced by said head;
   a second means for storing second data indicating a second track position on said spiral track of said disc which is next to be traced by said head;
   a first memory having a plurality of memory regions, each memory region storing a first rotating number of said disc corresponding to a relative distance between two spiral tracks of said disc, and one of said memory regions being accessed in accordance with said first and second data;
   a second memory for storing a second rotating number of said disc at a settling time period; and
   an address means for producing address signals in accordance with said first and second data to access said first and second memories;
   a calculating means for producing a head moving signal in accordance with said first and second data, and said first and second rotating numbers; and
   a control circuit for controlling said head to move from said first track position to said second track position in accordance with said head moving signal.

2. A disc control apparatus comprising:
   a head for reading information from a disc having a spiral track;
   a first means for storing first data indicating a first track position on said spiral track of said disc which is presently traced by said head;
   a second means for storing second data indicating a second track position on said spiral track of said disc which is next to be traced by said head;
   a first memory for storing a first rotating number of said disc at a time period during which said head is moved under a seek operation;
   a second memory for storing a second rotating number of said disc at a settling time period; and
   an address means for producing address signals in accordance with said first and second data to access said first and second memories;
   a calculating means for producing a head moving signal in accordance with said first and second data, and said first and second rotating numbers; and
   a control circuit for controlling said head to move from said first track position to said second track position in accordance with said head moving signal;
   said address means including a subtracter in which a subtraction between said first and second data is carried out to produce a subtraction signal, whereby one of said address signals is produced by combining said first data and said subtraction signal to access said first memory, and the other one of said address signals is produced directly from said first data to access said second memory; and
   said calculating means including an adder for adding said subtraction signal, and said first and second rotating numbers read from said first and second memories to produce said head moving signal.

3. A disc control apparatus according to claim 2, further comprising:
   an absolute value calculator for calculating an absolute value of said subtraction signal.

* * * * *